May 12, 1970  L. W. WALTHALL  3,510,948
DENTAL WEDGE
Filed Oct. 17, 1968
*Fig. 1*
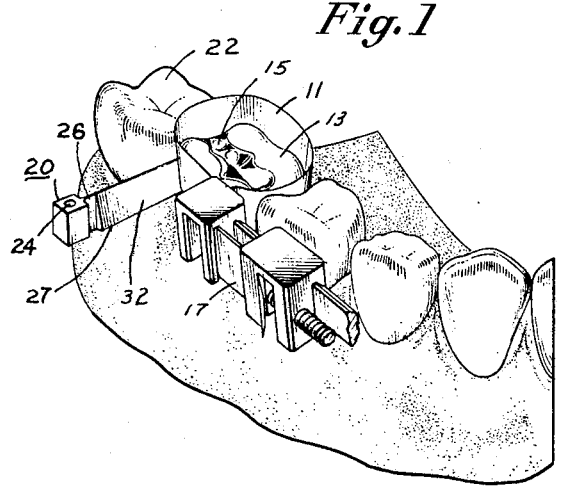
*Fig. 2*
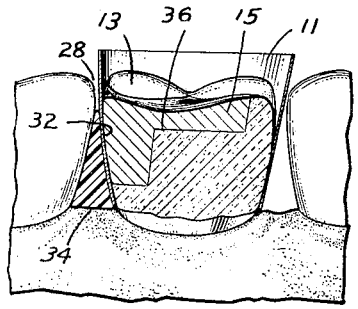
*Fig. 3*  *Fig. 4*
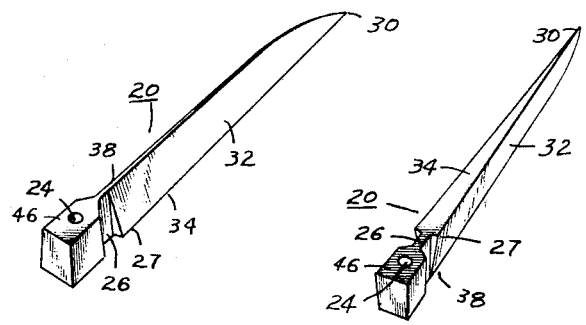
*Fig. 5*
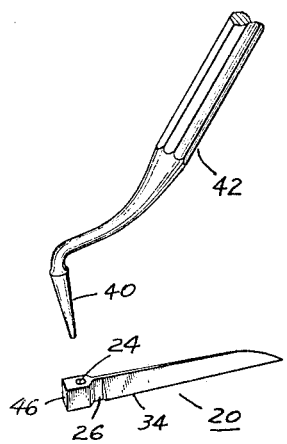
INVENTOR
Lowell W. Walthall
BY
Wofford & Felsman
ATTORNEYS

United States Patent Office 3,510,948
Patented May 12, 1970

3,510,948
DENTAL WEDGE
Lowell W. Walthall, 1024 Cavender,
Hurst, Tex. 76053
Filed Oct. 17, 1968, Ser. No. 768,288
Int. Cl. A61c 3/00
U.S. Cl. 32—64                              8 Claims

ABSTRACT OF THE DISCLOSURE

This specification discloses, for conforming a matrix to a surface of a tooth, a dental wedge characterized by an enlongated body having esesntially three longitudinally extending sides and tapering from a butt end to a pointed end, and an enlarged head containing a vertical aperture adapted to receive a tine of an instrument to facilitate insertion or removal of the wedge with any instrument having a tine. This specification also discloses an even more nearly universally useful dental wedge having, in addition to the body and the apertured enlarged head, a section of substantially uniform thickness adapted to be gripped by pliers; such as, over and under forceps; less than the thickness of the enlarged head and less than the thickness of the butt end of the body connecting the enlarged head with the butt end; whereby, either a tined instrument or pliers can be employed to readily manipulate the dental wedge.

BACKGROUND OF THE INVENTION

Field of the invention

This invention relates to dental wedges; and, more particularly, to a dental wedge which is more easily inserted and removed between the proximal walls of two adjacent teeth.

Description of the prior art

In making a restoration, or filling, involving the proximal surface, or side, of a tooth; a matrix, usually a thin metal sheet or thin metal band, is placed about a prepared cavity to provide a lateral wall for such cavity. The filling material can then be packed into the cavity and against the lateral wall. Without such a matrix, the soft material; such as, the amalgam alloy or silicate cement; would flow out the open proximal side of the cavity. It is conventional practice to insert a dental wedge adjacent to the matrix at the bottom of the tooth to ensure that the filling material does not ooze from the cavity and cause expense of removing hardened material or later physiological difficulties. The great variety of dental wedges introduced to meet this problem indicates its importance and their number indirectly attests to the lack of any simple, practical, easily manipulatable wedge to date. Solutions to avoid the difficulty manipulatable wedges have employed devices such as circling wires that can be twisted or screwed tightly about a matrix, effecting problems on insertion and removal. Other such solutions have employed a wide variety of yoked instruments having terminal prongs that could engage from the buccal and lingual sides and then be screwed closed to exert a conforming pressure to the matrix. Such yoked instruments actually engage the teeth rather than the matrix with the unfortunate result that maximum separation of the teeth is necessary in order to drive the prong far enough through the inter-dental space to meet, and support the center of the matrix. Besides the difficulty of adjusting the screw mechanism when used on posterior teeth, the yoke extending across the area of operation obscured the field and made it difficult to operate. Furthermore, inadvertent encountering of the yoke often caused the patient pain. The simplest devices attempted to be employed were, as usual in these cases, the most practical. These simple devices consisted of wooden wedges similar in shape to toothpicks. As with the other solutions and devices, however, manipulation of the wedges was difficult. If pliers or forceps were employed, the surface did not offer sufficient resistance to slippage either when inserting or removing the tool. The result was damage to the mouth and gums of, and discomfort to, the patient and exasperation of the dentist.

SUMMARY OF THE INVENTION

Accordingly, it is a main object of this invention to obviate the difficulties of the prior art by providing a dental wedge which is readily inserted or removed, or otherwise manipulated, to conform a matrix in proximal space when filling a cavity in a tooth.

It is a specific object of this invention to provide a dental wedge that can be inserted into or removed from the proximal space between teeth to conform a matrix by being gripped by forceps, or pliers, without danger of slippage; or by being suspended on a tine of an instrument; for example, the working end of a plugging tool, the point of a probe or explorer, or the tine of cotton pliers.

In accordance with one embodiment of the invention, there is provided a dental wedge comprising an elongated body having essentially three longitudinally extending sides and tapering from a butt end to a pointed end, and an enlarged head containing a vertical aperture adapted to receive a tine of an instrument to facilitate insertion or removal of the dental wedge with any instrument having a tine.

In accordance with another embodiment of the invention, there is provided a dental wedge comprising an elongated body having essentially three longitudinally extending sides and tapering from a butt end to a pointed end, an enlarged head containing a vertical aperture adapted to receive a tine of an instrument, and a section of substantially uniform thickness less than the thickness of the enlarged head and less than the thickness of the butt end connecting the enlarged head with the butt end adapted to be gripped by pliers; such as, over and under forceps; whereby either a tined instrument or pliers can be employed to readily manipulate the dental wedge.

BRIEF DESCRIPTION OF DRAWINGS

FIG. 1 is an isometric view illustrating the use of the dental wedge of the invention in conforming the matrix by insertion into the proximal space between adjacent teeth.

FIG. 2 shows a cross-sectional view of the dental wedge of the invention employed as shown in FIG. 1.

FIG. 3 is an isometric view of the top of a dental wedge of the invention such as might be employed in the proximal space.

FIG. 4 is an isometric view of the bottom of a dental wedge.

FIG. 5 is a perspective view of the dental wedge, as it might be employed to receive the tine of a plugger for ready insertion or removal.

DESCRIPTION OF PREFERRED EMBODIMENT(S)

The actual employment of a specific embodiment of a dental wedge of this invention is illustrated in FIGS. 1 and 2. Therein, a matrix comprising metal band 11 is placed about the proximal surface of tooth 13 to provide a wall to sustain the filling material 15. The matrix is usually supported by standard matrix holder 17.

With the matrix in position dental wedge 20 is now introduced so as to conform the matrix to the proximal surface of the tooth prior to filling. The dental wedge 20 is readily inserted into the proximal space between tooth 13 and tooth 22 by inserting the tine of an instrument into vertical aperture 24, described in greater detail hereinafter, or by grasping the uniform section 26 with pliers, or forceps. Dental wedge 20 is inserted in essentially horizontal direction at approximately a right angle to the inter-dental space between the teeth. The narrow tip 30, FIG. 3, is inserted first, oriented so the flattened side 32 rests against the matrix. As the dental wedge is inserted, the base 34; that is, the widest edge at the butt end; comes to rest against the gum tissue. Dental wedge 20 is introduced gradually so that the wedging action develops reciprocal pressure from the slot separation of the two teeth. This pressure is essentially a function of the elasticity of the teeth-supporting ligaments and bone, and, hence, has a natural or physiological quality that not only prevents damage to the teeth through overstraining but also ensures that the filling being made will have a proper contact with the adjacent tooth since it will be based upon this natural measure of the two teeth's tendency to displacement. This same pressure acting along the dental wedge conforms the matrix against the edge of the cavity. The dentist, in inserting dental wedge 20, can observe as well as sense the pressure exerted, thus readily make optimum insertion of the wedge. The pressure also keeps the wedge in position, making it self-retaining.

The filling material 15 is placed in the cavity 36, FIG. 2, and packed with a plugging tool. The dental wedge holds the matrix 32 tightly against the proximal surface of the cavity and prevents any oozing of filling material between matrix 11 and the tooth's proximal surface. After the filling material undergoes initial setting, the dental wedge is gently withdrawn. The gentle narrowing of dental wedge 20 to end 30 facilitates withdrawal without disturbing the matrix or filling. The matrix is next removed and the filling given its preliminary carving and finish.

As illustrated in FIG. 3, dental wedge 20 has an elongated body extending from butt end 27 to pointed end 30. The body tapers progressively from a fairly broad base at butt end 27 to a very narrow base at pointed end 30. The body is generally triangular in cross-section with essentially three sides, two longitudinally extending sides 32 and a base 34. The two sides 32 bear on a matrix and a tooth, respectively, when the wedge is inserted into the proximal space between a matrix and a tooth. Sides 32 may have a slight concavity extending transversely of the body member, and more nearly conform the matrix to the convexity of the tooth with less pressure. Base 34 ordinarily slides on the gum when the wedge is inserted between two teeth. Top 38 may be simply an edge formed by intersection of sides 32 or it may have some width. It may have any shape in cross-section as long as it is sufficiently narrow to be inserted between the teeth. Enlarged head 46 is penetrated by vertical aperture 24 and is connected to butt end 27 by a uniform section 26. By vertical aperture is meant an aperture traversing the head from top 38 to base 34, hence vertical on normal insertion.

Dental wedge 20 is illustrated in an inverted position in FIG. 4, base 34 being shown above top 38. As illustrated therein, uniform section 26 facilitates gripping the dental wedge 20 with forceps or pliers for ready insertion or removal. Slipping of the forceps or pliers in either direction is prevented by enlarged head 46 and butt end 27, both thicker than uniform section 26. The narrowing of base 34 from its butt end 27 to pointed end 30 is readily apparent. Top edge 38 will ordinarily not have appreciable thickness, even at its butt end as illustrated in FIG. 3.

In the inverted position dental wedge 20 is readily inserted into the proximal space between upper teeth such that base 34 again would ultimately come to rest against the gum and side 32 would conform a matrix to the proximal surface of a tooth and prevent filling material from oozing between the matrix and the proximal surface of the tooth.

FIG. 5 illustrates schematically the relationship of tine, or working end, 40 of a plugger 42 to vertical aperture 24 in dental wedge 20. Aperture 24 may have uniform diameter and tine 40 inserted there into, and set and held by frictional forces alone. On the other hand, aperture 24 may be adapted to conformingly receive the tine. Expressed otherwise, aperture 24 may have its largest diameter at the top of wedge 20 and have a tapering, or lessening of diameter, to its minimum diameter at base 34. In this way, tine 40 bears against the wall of aperture 24 over the entire distance. Thus, once tine 40 is inserted into aperture 24, it is frictionally held in position and easy insertion of dental wedge 20 is effected when the aperture is adapted to conformingly receive the tine. As depicted, dental wedge 20 is held on tine 40 mainly by frictional force, although here is a slight gravitational force and moment arm tending to hold the wedge rigidly on to tine 40.

The frictional force is adequate to maintain dental wedge 20 on a tine of an instrument and the technique employed in inserting and removing dental wedge 20 is the same for both upper and lower teeth, however, the dental wedge is particularly useful when the inverted dental wedge, such as illustrated in FIG. 4 is to be inserted in upper teeth. On one hand in this instance, tine 40 would be inserted from top 38 upward toward base 34 such that both gravity and friction tends to hold dental wedge 20 on to tine 40 and facilitates insertion and removal of the dental wedge from the proximal space of the upper teeth.

On the other hand, as noted hereinbefore, the dental wedge may be readily manipulated with pliers or forceps, since a uniform section 26 is provided having uniform cross-sectional thickness but thinner than butt end 27 and thinner than enlarged head 46. In this way, insertion or removal may be readily effected by relying not only on the frictional forces applied by the pliers or forceps but upon the identation of uniform section 26 and the shoulders formed by base 27 and enlarged head 46.

Dental wedge 20 should be constructed of a material which is compressible to some extent; preferably, the material is at least as compressible as maple wood to ensure the conformance of the matrix with the proximal surface of the tooth. The material of which dental wedge is constructed must, however, have a modulus of compressibility which will effect appreciable force against matrix 11 when inserted into the proximal space. Dental wedge 20 may be formed of a material which is sterilizable and reusable. Alternatively, because of simplicity of construction, the dental wedge may be designed for one use only. Preferred materials of construction are polypropylene, nylon and Teflon plastics. Other satisfactory materials which can be employed in making the dental wedge 20 are dense synthetic rubbers, such as those of neoprene, polybutadiene, and polystyrene.

The foregoing description has been given of the most nearly universally useful dental wedge, one that can be manipulated by either the tine of an instrument or by pliers. In my practice, however, I have found that, ordinarily, using a tine of an instrument is the most expeditious manipulation since the dentist is generally employing an instrument having a tine.

Accordingly, a dental wedge of great usefulness is provided by joining the tapered body described hereinbefore directly to the enlarged head described hereinbefore. A dental wedge having the following dimensions has been found to work well:

| Description: | Dimension in inch |
|---|---|
| Total length of the wedge | 0.8 |
| Height of the wedge | 0.125 |
| Width of base at the butt end | 0.08 |
| Width of top at the butt end | 0.008–0.010 |
| Dimension of substantially square enlarged head | 0.10–0.115 |
| Diameter of the vertical aperture in the head: | |
| (a) At the top | 0.040 |
| (b) At the base | 0.025 |

Although the invention has been described herein with a certain degree of particularity, it is understood that the present disclosure has been made only by way of example and that numerous changes in the details of construction and the combination and arrangement of parts may be resorted to without departing from the spirit and scope of the invention.

What is claimed is:

1. A dental wedge comprising an elongated body having essentially two longitudinal extending sides and a base and tapering from a butt end to a pointed end; an enlarged head connected with said butt end of said body; and an aperture traversing said enlarged head from said base to the top of said dental wedge and adapted to receive a tine of an instrument, whereby said dental wedge can be frictionally set on a tine of an instrument and readily inserted into or removed from the proximal space between adjacent teeth.

2. The dental wedge of claim 1 wherein said enlarged head is connected with said butt end of said body by a section of substantially uniform thickness less than the thickness of said enlarged head and less than the thickness of said butt end and adapted to be gripped by pliers, whereby either a tine of an instrument or pliers can be employed to readily insert and remove said dental wedge.

3. The dental wedge of claim 1 wherein said vertical aperture is of uniform diameter.

4. The dental wedge of claim 1 wherein said vertical aperture has its largest diameter at the top of said wedge and tapers to a lesser diameter at the bottom of said wedge.

5. The dental wedge of claim 4 wherein said vertical aperture is adapted to conformingly receive a tine of an instrument.

6. The dental wedge of claim 2 wherein said vertical aperture is of uniform diameter.

7. The dental wedge of claim 2 wherein said vertical aperture has its largest diameter at the top of said wedge and tapers to a lesser diameter at the bottom of said wedge.

8. The dental wedge of claim 7 wherein said vertical aperture is adapted to conformingly receive a tine of an instrument.

References Cited

UNITED STATES PATENTS

| 442,107 | 12/1890 | Davison | 32—64 |
| 3,193,094 | 7/1965 | Schulstad | 32—64 XR |

ROBERT PESHOCK, Primary Examiner